US007703626B2

(12) United States Patent
Witt

(10) Patent No.: US 7,703,626 B2
(45) Date of Patent: Apr. 27, 2010

(54) COMPOSITE CLOSURES FOR CONTAINERS

(76) Inventor: Stephen H. Witt, 5 Tara Place, Smithville, Ontario (CA) L0R 2A0

( * ) Notice: Subject to any disclaimer, the term of this patent is extended or adjusted under 35 U.S.C. 154(b) by 619 days.

(21) Appl. No.: 11/363,272

(22) Filed: Feb. 28, 2006

(65) Prior Publication Data

US 2006/0201946 A1      Sep. 14, 2006

Related U.S. Application Data

(60) Provisional application No. 60/656,408, filed on Feb. 28, 2005.

(51) Int. Cl.
*B65D 17/40*    (2006.01)
(52) U.S. Cl. .................. 220/276; 215/252; 215/254; 215/256; 215/317; 220/270
(58) Field of Classification Search ............ 215/252, 215/254, 256, 317; 220/276, 270
See application file for complete search history.

(56) References Cited

U.S. PATENT DOCUMENTS

| 3,067,898 | A | * | 12/1962 | Reimann | ........................ 215/249 |
| 3,460,701 | A |  | 8/1969 | Powalowski et al. | |
| 3,746,199 | A |  | 7/1973 | Hart et al. | |
| 4,089,433 | A |  | 5/1978 | Jonsson | |
| 4,562,931 | A | * | 1/1986 | Brach et al. | ........................ 215/220 |
| 4,989,740 | A |  | 2/1991 | Vercillo | |
| 5,002,198 | A |  | 3/1991 | Smith | |
| 5,685,443 | A |  | 11/1997 | Taber et al. | |
| 6,053,353 | A |  | 4/2000 | Helms | |
| 6,523,713 | B1 |  | 2/2003 | Helms | |
| 6,772,901 | B2 |  | 8/2004 | Witt | |

FOREIGN PATENT DOCUMENTS

GB           2052455 A      1/1981
WO      WO 96/27532         9/1996

OTHER PUBLICATIONS

Notification of Transmittal of the International Search Report and the Written Opinion of the International Sarching Authority, or Declaration (3 pages), PCT International Search Report (4 pages), and Written Opinion of the International Searching Authority dated Jun. 27, 2006, International Application No. PCT/CA2006/000296—Filed: Feb. 28, 2006 (6 pages).
Supp. European Search Report in corresponding European App. No. EP 06705250.6, dated Feb. 16, 2009 (5 pp.).

* cited by examiner

*Primary Examiner*—Anthony Stashick
*Assistant Examiner*—Elizabeth Volz
(74) *Attorney, Agent, or Firm*—Dinesh Agarwal, P.C.

(57) ABSTRACT

Conventional adhesive and contact welding methods for holding the paperboard and plastic components of a composite closure together present a number disadvantages and do not lend themselves easily to mass production. The present invention describes two novel approaches, firstly the pre-assembly heating of the closure components with directed hot air to partially melt the thermoplastic surfaces and allow the parts to be immediately assembled sealingly and, secondly, a novel construction of plastic and paperboard composite closure in which the plastic rim is of a two-piece snap-fit constructions which firmly grips the top panel of the paperboard lid.

2 Claims, 9 Drawing Sheets

SECTION A-A

COMPOSITE CLOSURES FOR CONTAINERS

RELATED APPLICATION

This application replaces and claims priority from U.S. provisional patent application No. 60/656,408 filed on Feb. 28, 2005 and entitled COMPOSITE CLOSURE FOR CONTAINERS, incorporated by reference.

FIELD OF INVENTION

This invention relates generally to composite lids for containers and particularly to tamper-resistant, tamper-evident composite lids for containers for products that present significant concerns for the consumer about unauthorized tampering with the product (e.g. food products and other consumables).

By a "composite" lid, is intended a lid composed of a sheet of printed matter (e.g. paperboard) serving as a top panel cover and a molded plastic rim secured to and compatible with the panel material to form the means for engaging the lid to a container. Where they are capable of being used in place of wholly plastic lids, composite lids allow for reduced material costs and superior lid-top graphics.

A composite container closure of this general kind is exemplified by the tamper resistant composite lids for food containers which are the subject of U.S. Pat. No. 6,772,901 (Witt), owned by the assignee of rights in the present application. In the Witt composite closure member, a cover panel formed from generally flexible sheet material is peripherally sealed to an annular ledge formation which joins two cylindrical ring portions of a closure member having a rupturable line of weakness which breaks upon any attempt to prise the lid off, thereby providing evidence of tampering. The entire specification of U.S. Pat. No. 6,772,901 is expressly incorporated herein by reference for its teaching of tamper-evident closures.

BACKGROUND OF THE INVENTION

In the ice cream packaging industry, a variety of closure arrangements are used to hold a paperboard, plastic or composite lid in place on the paperboard container or tub holding the ice cream. An example of the combining of paper and plastic in the design of a container closure of this general kind is afforded by U.S. Pat. No. 6,053,353 (Helms), in which the composite lid includes a blank of sheet material and a peripheral molding, with a marginal portion of the blank being displaced out of the general plane of the central panel. The peripheral molding includes the marginal portion of the blank bonded to a portion of the rim on an exterior surface, in order to control longitudinal shrinkage and provide a printed surface on the marginal section.

In the composite lid of aforementioned U.S. Pat. No. 6,772,901, the top portion of the lid consists of a polymeric layer for moisture resistance attached to a paper disk suitable for the application of product identification printing on the top side. A poly-layer on the underside of the paper disk keeps moisture from the product from entering the paper and enables the disk to be bonded to the plastic ring. The top and bottom portions of the ring are bonded together by fusing the poly-layer of the paper to a landing on the plastic ring by conduction, ultrasonic or spin welding. Alternatively, a coating of adhesive applied to either surface before insertion of the disk may be used. Once joined together, the upper and lower portions form a composite-closure.

SUMMARY OF THE INVENTION

It is a general object of the present invention to provide composite container closure members, comprising a plastic rim and paperboard lid, in which the lid is sealingly secured to inwardly directed peripheral means on the rim, without the requirement for any adhesives or any contact welding treatment such as conduction, ultrasonic or spin welding.

It is a further object of the present invention to provide composite container closure members of this kind, including tamper-resistant, tamper-evident features.

According to a first embodiment of the invention, the plastic rim comprises a lower, inner ring portion and an upper, outer ring portion, both made of a fusible thermoplastic material such as low density polyethylene (LDPE). The lower ring portion includes an upper peripheral edge formation adapted to fit matingly within a cylindrical trough formed within the upper ring portion, and an inner ledge formation to support a paperboard lid. That lid has at least its upper surface coated with a film of the same thermoplastic material as the rings.

The upper ring portion includes an inwardly projecting annular flange parallel to the outer periphery of the lid. In a pre-sealing position, the upper ring and the lower ring holding the paperboard disk lid are maintained slightly apart. Hot air is directed into the trough portion of the upper ring and at the underside of the annular flange. When the lower surface of the flange and the inner-side wall of the trough of the upper ring become molten, the upper ring is vertically lowered into its mating position with the lower ring and the upper ring adheres to the thermoplastic layer on the paperboard and to the outer side-wall of the lower ring.

According to a second embodiment of the invention, the plastic rim is of a two-piece snap-fit construction including an inwardly directed peripheral means which grips the top panel of the paperboard lid securely when assembled.

DESCRIPTION OF THE PREFERRED EMBODIMENTS

Figure 5:
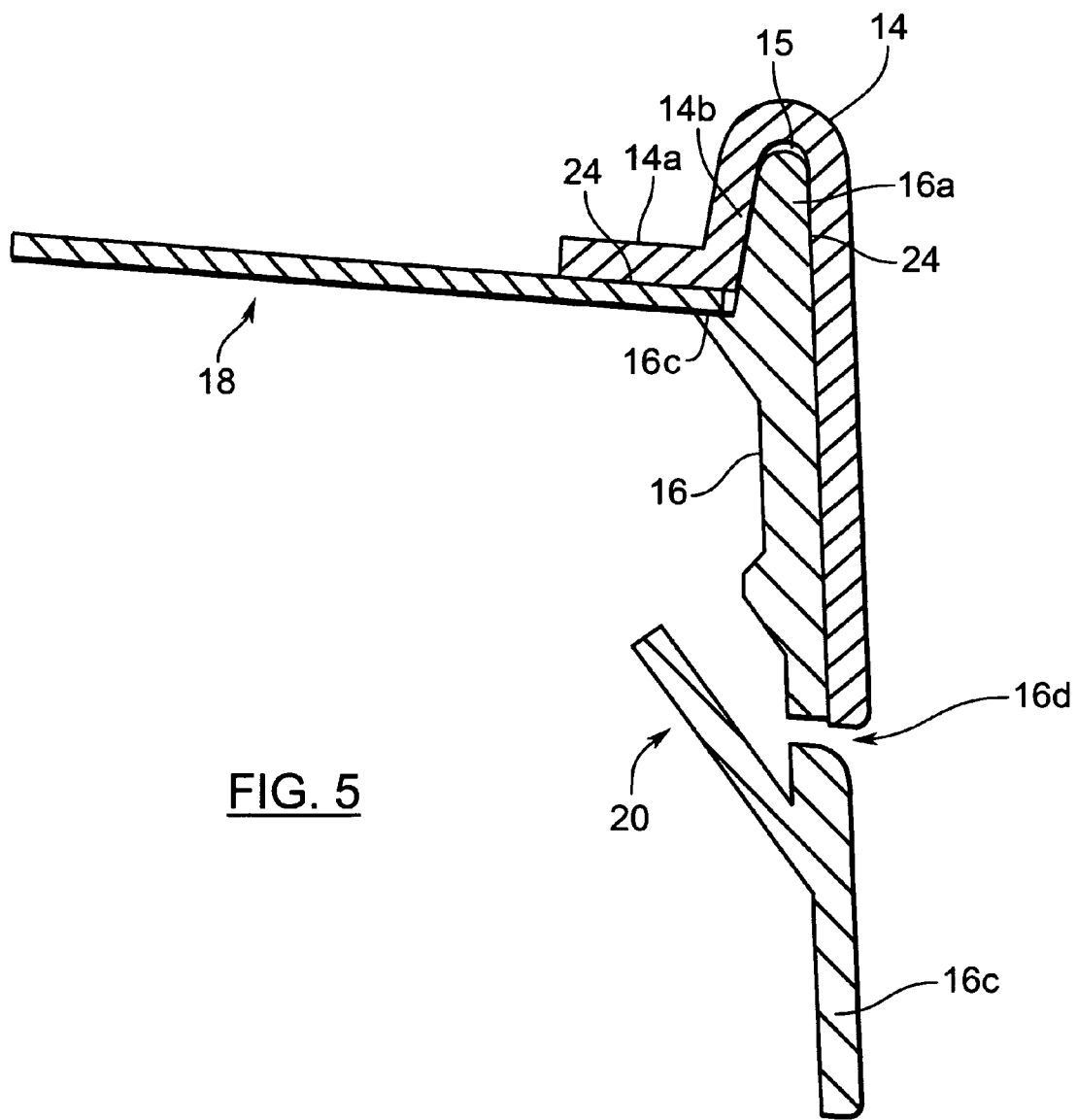
FIG. 5 is an enlarged sectional view along line A-A in FIG. 4a of the mutually engaging components of the container and lid when assembled according to the first embodiment of the invention.

As best seen in FIGS. 1-3, 5 and 9, a composite closure 10 according to the present invention and adapted to seal a conventional ice cream container 12, comprises an upper cylindrical ring 14 and a lower cylindrical ring 16, both made of resilient-plastic, which fit together to hold a paper lid cover portion 18 flat in the horizontal plane, perpendicular to the axis of the container when the closure is in place. As best seen in FIG. 5, upper ring 14 presents at its upper end a concave trough 15 adapted to closely receive an elongate bead 16a integral with lower ring 16. Lower ring 16 also features regularly spaced ledge formations 16b for peripheral seating of the paperboard disk 18.

Integral with upper ring 14 is an annular flange 14a which contacts the upper surface of lid 18 when outer ring 14 is fitted closely over lower ring 16 as illustrated in FIG. 5.

Upper ring 14 and lower ring 16 are fabricated of a meltable thermoplastic such as low-density polyethylene (LDPE) and at least the upper layer of disk 18 is coated with a fusible poly-layer. Optionally and advantageously, a poly-layer is also applied to the underside of paper disk 18 to keep moisture from the product from entering the paper.

The upper and lower ring portions of the closure are bonded together and to the top poly-layer of the paper by a novel hot-air welding method which will be described below and which is simpler and more efficient than conventional laser or ultrasonic welding of the components of a composite lid.

Figure 9:
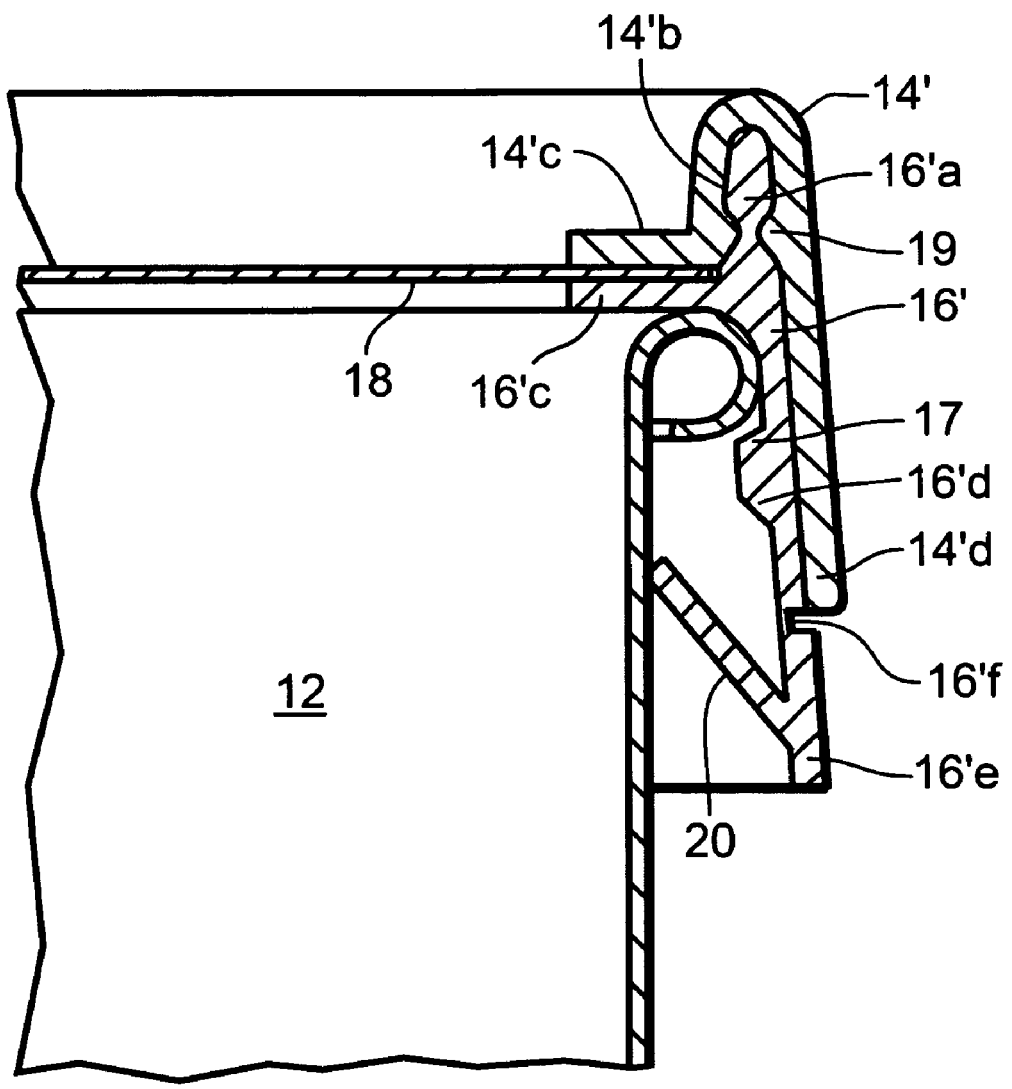
FIG. 9 is an enlarged sectional view along line A-A in FIG. 4c of the mutually engaging components of a container and lid according to the second embodiment of the invention, when assembled.

In the particular embodiments of the invention illustrated in the drawings, the lower ring is also a tamper-evident closure component. As best seen in FIGS. 5 and 9, lower cylindrical ring 16 [16'] includes a lower portion 16c [16'e] which joins the upper portion of wall 16 [16'] along a ring which is thinned and weakened by means of a circumferential notch 16d [16'f]. Legitimate opening of the container by a consumer starts by separating the upper and lower portions of cylindrical ring 16 [16'] by tearing away the lower part 16c [16'e] thereof along the line of weakness 16d [16'f]. Alternatively, the tear-away portion may be joined to the rest of the closure by separate frangible tabs.

Extending upwardly and inwardly from the lower portion 16c [16'e] of lower ring 16 [16'] are a circumferentially spaced plurality of teeth 20 which lock under the rim 12a of container 12 when the lid is first pushed downwardly to seal the container.

Figure 1:
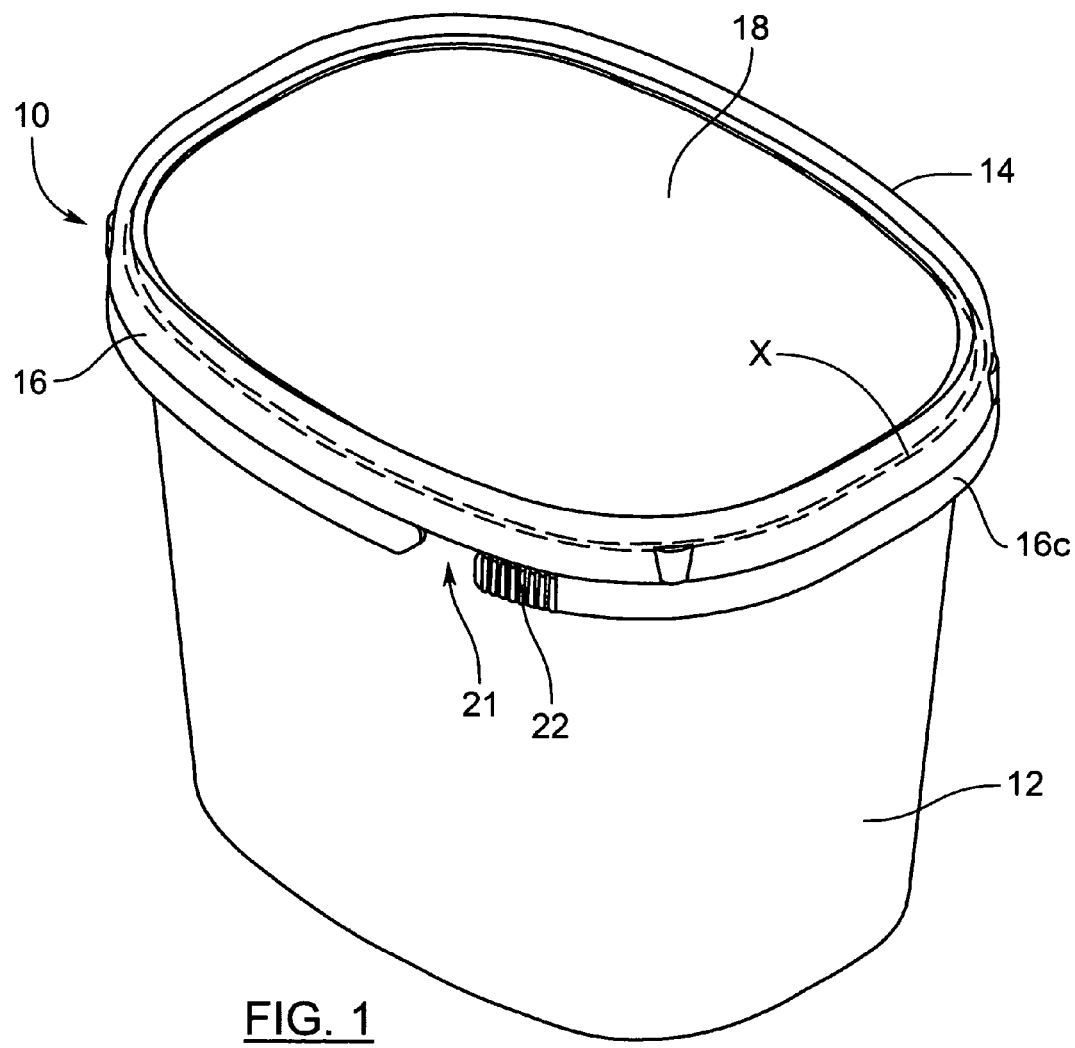
FIG. 1 is a top perspective view of an ice cream container with closure means according to either of the embodiments of the present invention, including tamper-resistant, tamper-evident features.
Figure 2:
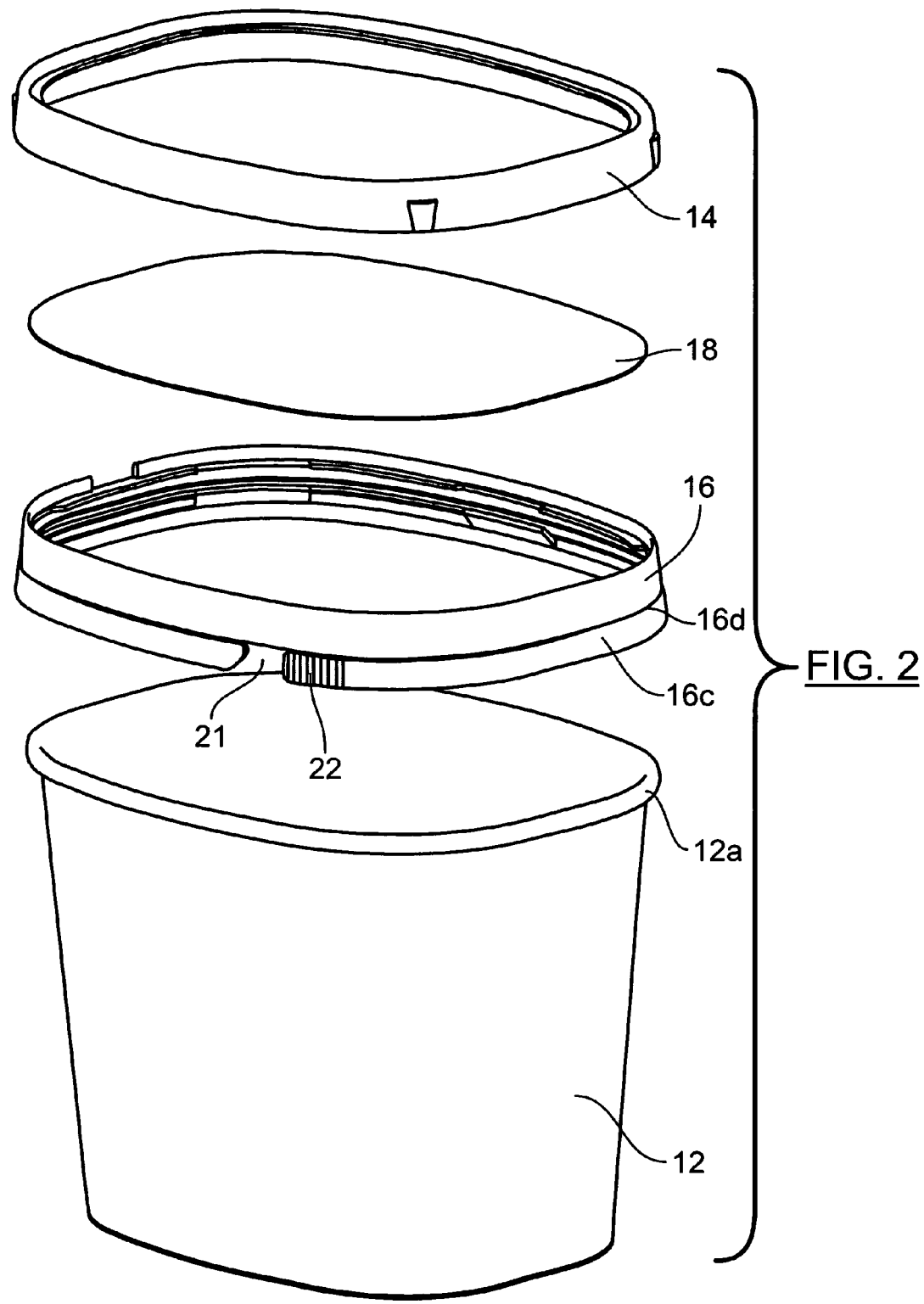
FIG. 2 is an exploded view of the ice cream container of FIG. 1, with lid components according to the first embodiment of the invention.
Figure 3:
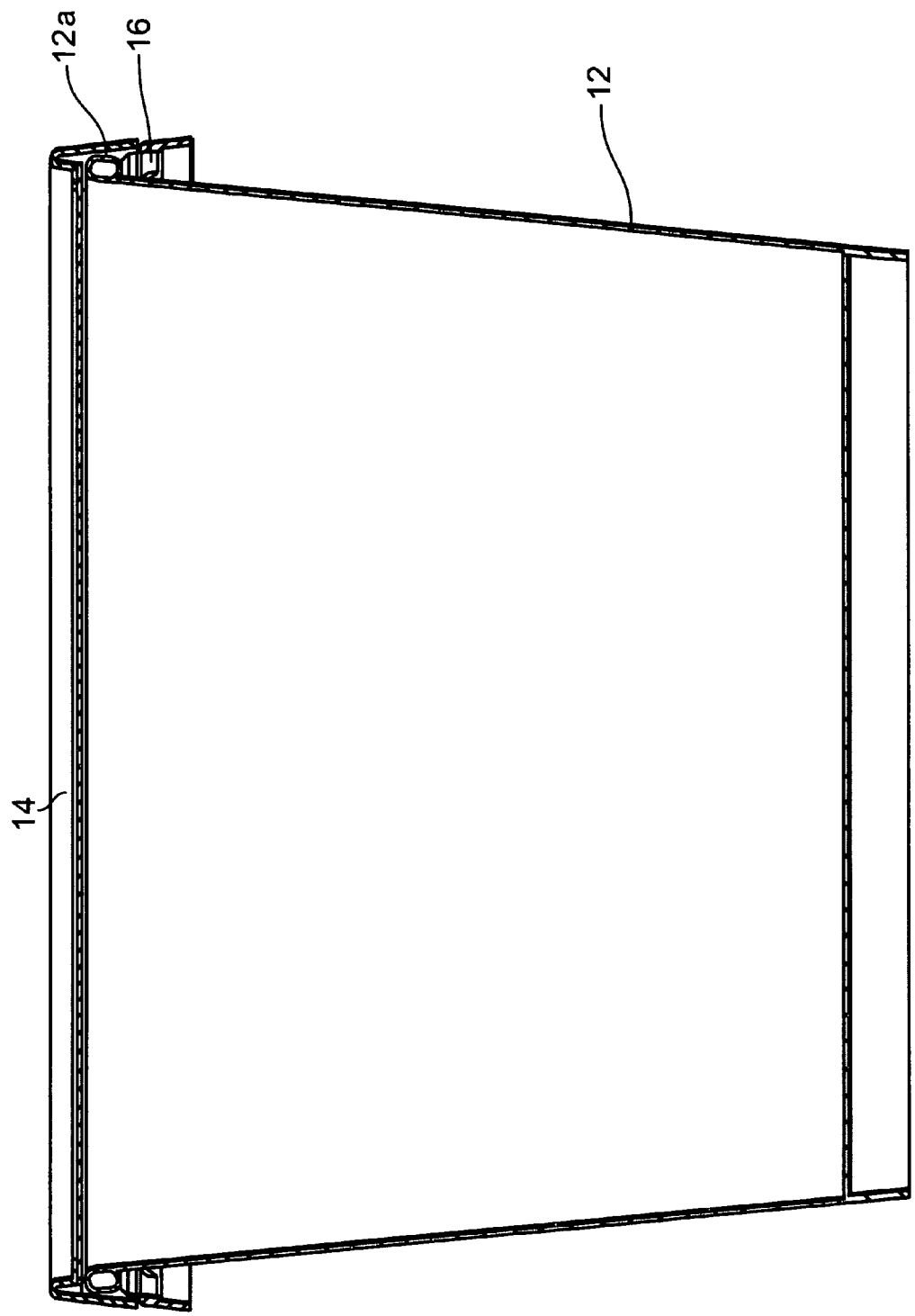
FIG. 3 is a vertical cross-sectional view taken along the long axis X of FIG. 1 of an ice cream container which includes closure means according to the first embodiment of the invention.
Figure 4A:
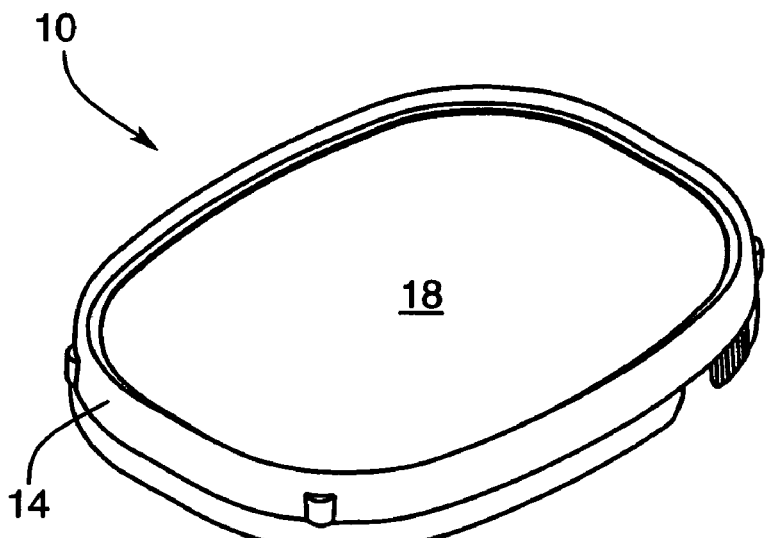
FIGS. 4a, 4b and 4c are respectively perspective, side elevational, and top plan views of assembled closure means according to either embodiment of the invention.
Figure 4B:
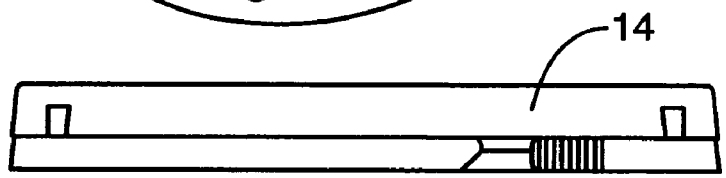
Figure 4C:
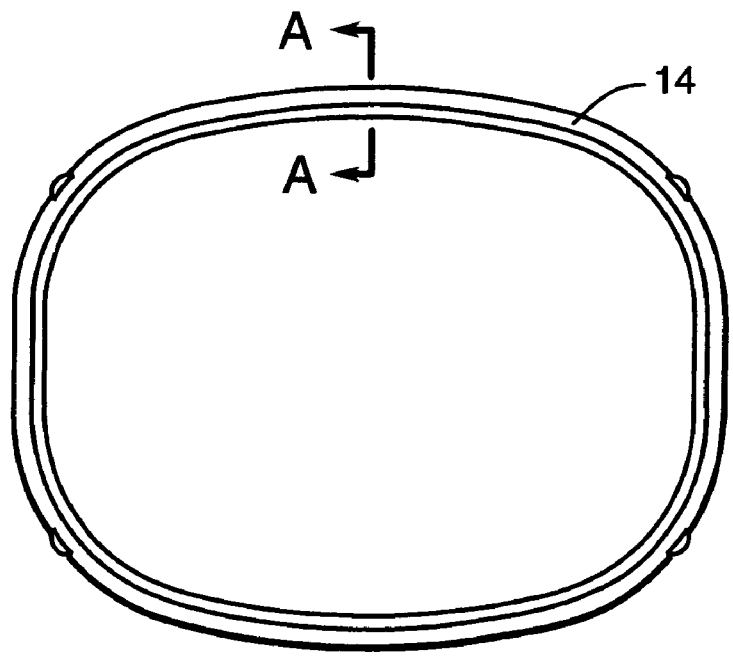

For convenience in legitimately opening the container, the lower part 16c [16'e] of the lower cylindrical ring portion 16 [16'] may be provided with gripping means such as a thumb notch 21 disposed at a location on the lower periphery, as best seen in FIGS. 1 and 2. By exerting moderate force on the accessible edge portion 22 (here shown serrated for easy gripping), that part of ring 16 [16'] which is below the line of weakness 16d [16'f] is readily removed as a tear-away strip, taking with it the circumferential line of teeth 20, for easy removal from the closure and from the container.

Method of Hot Air Sealing of Composite Lid Components

In connection with this first embodiment of the present invention, special reference may be made to drawing FIGS. 1-8. The hot-air welded surfaces joining upper ring 14 to lower ring 16 and upper ring annular flange 14a to the plasticized upper surface of paperboard lid 18 are indicated in FIG. 5 by arrows 24.

The essential process of the invention comprises maintaining upper ring 14 spaced slightly above lower ring 16 in which paperboard disk has already been seated flat on ledge formations 16b. Hot air is then injected into the trough 15 in direction toward flange 14a and the inner side-wall 14b immediately connecting to flange 14a.

Figure 6:
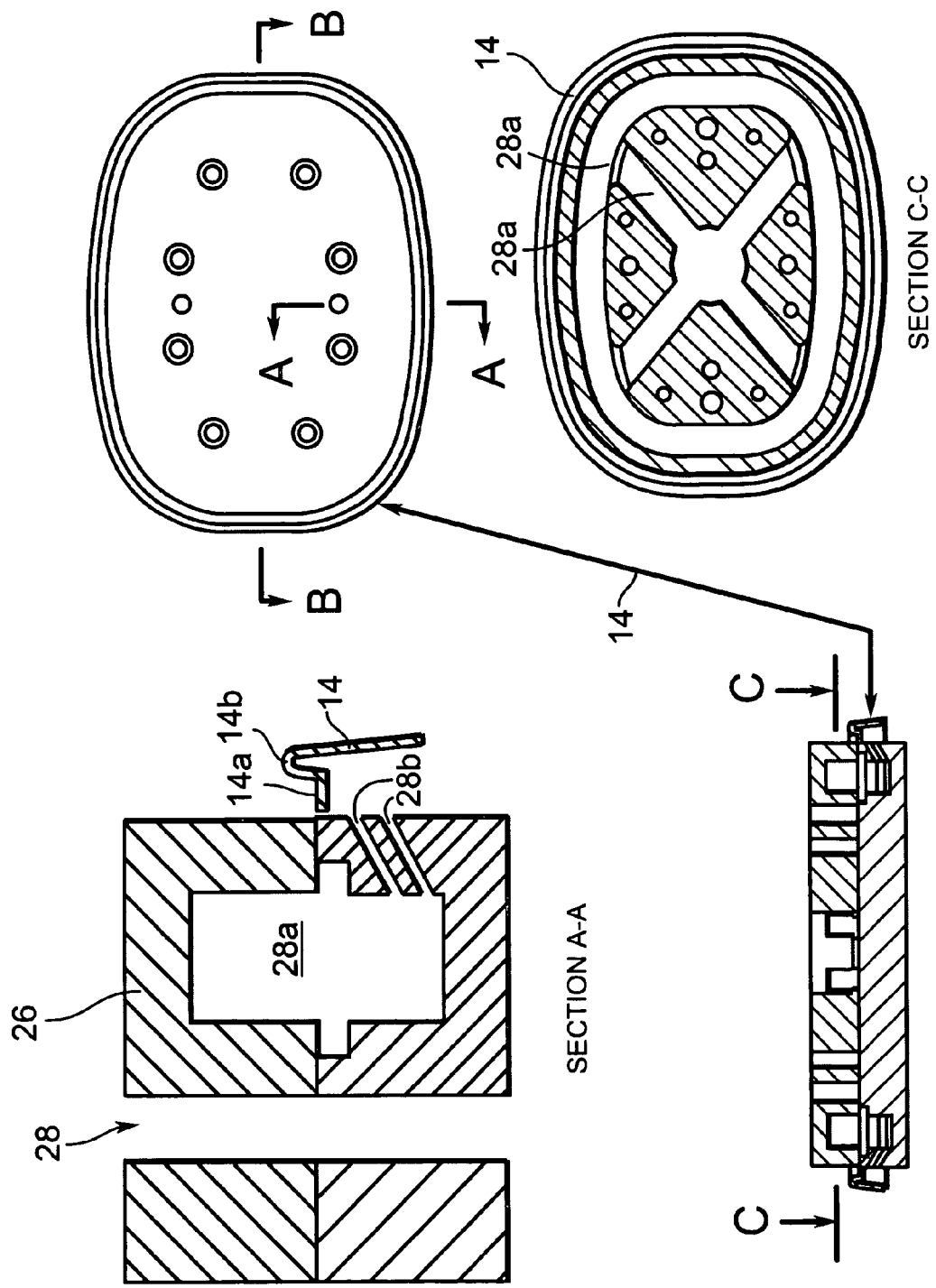
FIG. 6 schematically illustrates means for heating the lid components prior to assembly, according to the first embodiment of the invention.
Figure 7:
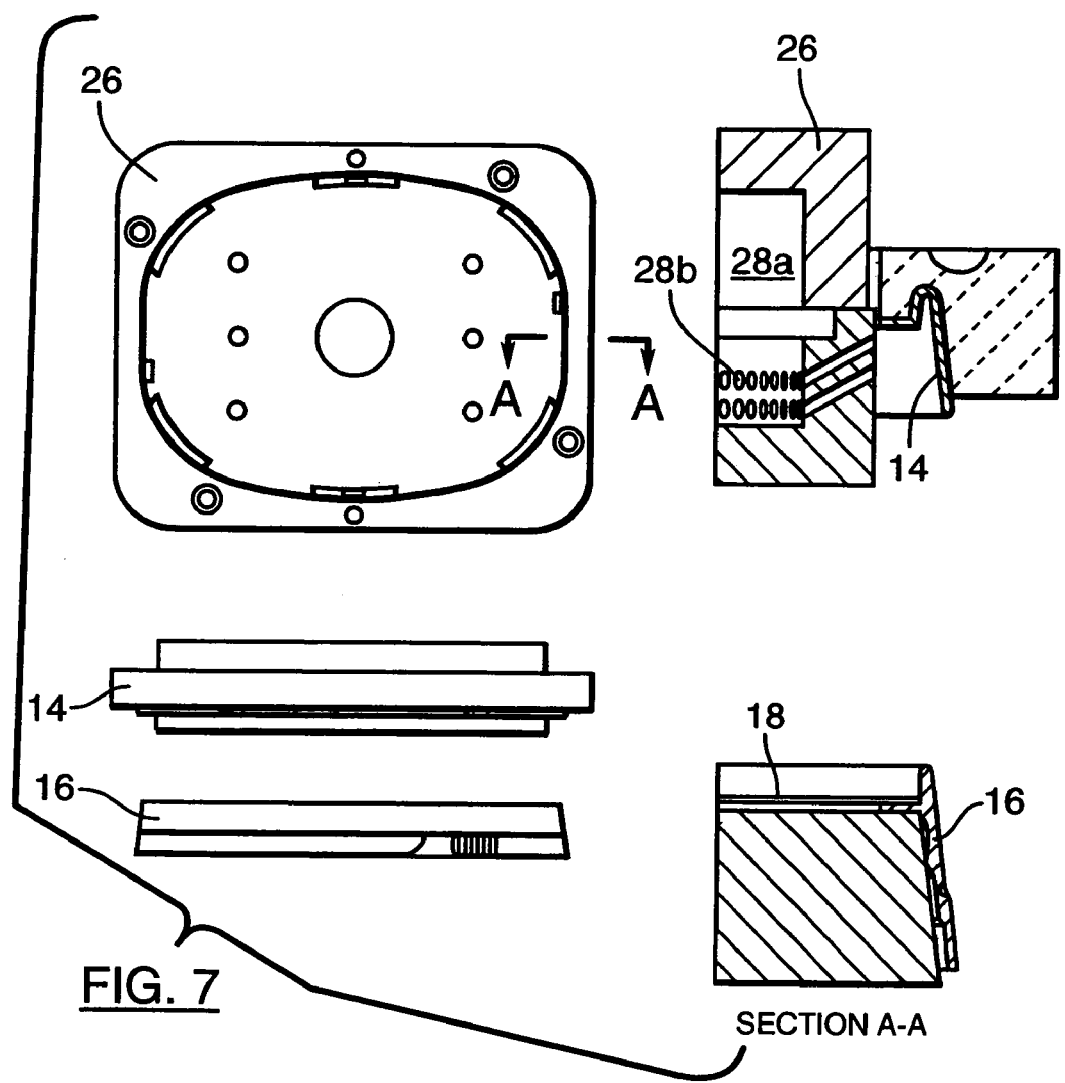
FIG. 7 schematically illustrates the set position of the heated composite lid components immediately prior to assembly, according to the first embodiment of the invention.
Figure 8:
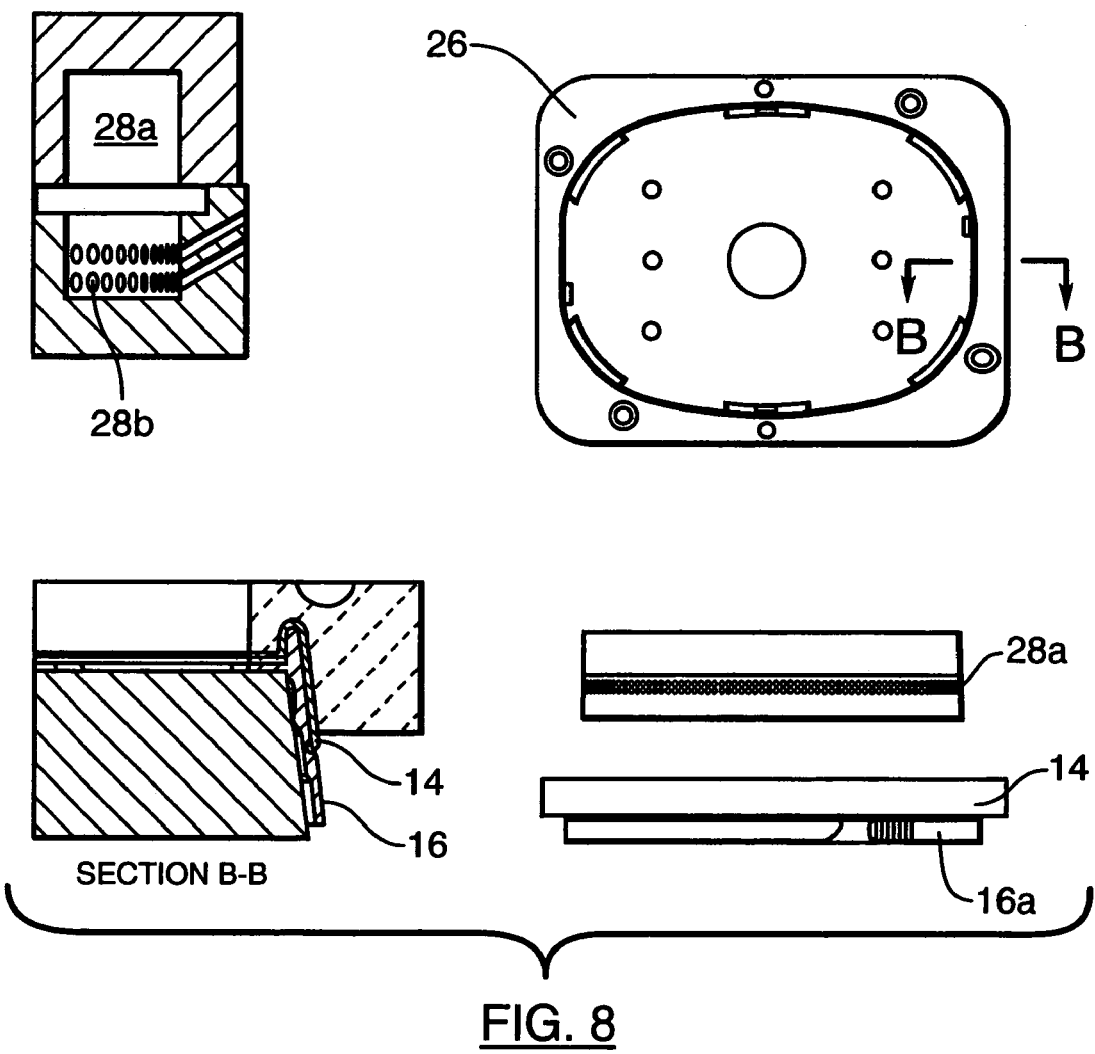
FIG. 8 schematically illustrates the contacting and final assembly of the components of the composite closure according to the first embodiment of the invention.

FIG. 6 schematically illustrates a holder 26 for upper ring 14 which includes a central port 28 for receiving hot air from a source of heated air and which branches into hot air channels 28a including peripheral hot air ports 28b for directing hot air at contact portions 14a and 14b of upper ring 14. In the "heat" position illustrated in FIG. 7, the upper ring 14 is held so that hot air is directed into trough 15 toward the annular flange 14a and inner side-wall 14b of upper ring 14. The lower ring is aligned in position directly beneath. After a suitable period of time in the heat position, the annular flange and inner side-wall become molten and are ready to be moved to the "marriage" position illustrated in FIG. 8.

The marriage position is effected, after sufficient heat is added to upper ring 14, by moving the upper ring holder 26 down for mating contact of upper ring 14 with lower ring 16. The molten annular flange 14a adheres to the polyethylene layer on the upper surface of paperboard 18 and the molten side-wall 14b adheres to the outer side-wall of lower ring 16. A slight clamping pressure may be applied while the thermoplastic solidifies, for a stronger seal.

Snap-Fit Construction of Composite Lid

In what follows, reference may be made to drawing FIGS. 1, 4a to 4c and 9. According to this embodiment of the invention, the composite closure for sealing a conventional ice cream container 12 again comprises an upper cylindrical ring, 14' and a lower cylindrical ring 16', both made of resilient plastic. Upper cylindrical ring 14' includes an interior recess towards its upper peripheral margin 14'b, configured to receive and snap-fit over an upper peripheral integral projection 16'a on inner ring 16'.

About their respective concave inner surfaces, upper and lower cylindrical rings 14' and 16' present superposable annular flanges 14'c and 16'c, respectively, which come together to securely hold a paper lid cover portion 18 flat in the horizontal plane perpendicular to the vertical axis of the container when the closure is in place.

The lower portion of rings 14' and 16' may be further releasably held in close contact by an arrangement of interdentate wall projections 17 which are disengaged if the lower periphery 14'd of the upper ring is manually pulled away from the corresponding bottom portion 16'd of the inner cylindrical ring. The mating surfaces of 14' and 16' may advantageously include a "neck" region 19 for a more secure snap-lock fit.

Variations on interlocking geometries which achieve the objective of the present invention in "clamping" of the periphery of the paperboard lid 18 in a single unitary closure could readily be made without departing from the spirit of the invention.

In the particular embodiment illustrated in the drawings, the closure including the snap-fitted cover lid is also a tamper-evident closure. Extending upwardly and inwardly from the lower peripheral margin 16'e of lower ring portion 16 are a circumferentially spaced plurality of teeth 20 which lock under the rolled rim 12a of container 12 when the lid is first pushed downwardly to seal the container.

As best seen in FIG. 9, a circumferential portion of the wall of lower cylindrical ring 16' is thinned and weakened, here by means of a circumferential notch 16'f. Legitimate opening of the container by a consumer starts by a separation of the upper and lower portions of cylindrical ring 16' by tearing away the lower part thereof along the line of weakness 16'f. Alternatively, the tear-away portion may be joined to the rest of the closure by separate flangeable tabs.

As with the tamper-evident disclosure discussed above and again as shown in FIG. 1, the lower cylindrical ring portion may be provided with gripping means such as a thumb notch 21 disposed at a location on the lower periphery. By exerting moderate force on the serrated accessible edge portion 22, that part of the lower ring 16' which is below the line of weakness 16'f is readily removed as a tear-away strip, taking with it the circumferential line of teeth 20, for easy removal from the closure and from the container.

As noted above, disk 18, typically made of paperboard or the like, may be printed on its upper side for product identification, marketing information, graphics, etc. For use of ice cream food products, a paper disk 18 will generally have a polymeric film permanently attached to the underside, for keeping moisture from entering through the paper. However, according to this embodiment of the invention, the securing of the paperboard lid to the plastic portion of the closure is achieved entirely by the clamping fit action of ring sections 14'c and 16'c as described above.

By contrast with prior art composite container closures in which the paper lid portion is moulded right into the container side-wall or is laser-welded or otherwise chemically adhered to the plastic material of the closure, the closure in this arrangement allows paper disk 18 to be completely removed from the plastic ring, making recycling a simple matter.

While only a single example of this embodiment of the invention has been illustrated, those of ordinary skill in the art will readily appreciate a number of modifications to the illustrated snap-fit arrangement in composite lids, within the inventive concept.

The invention claimed is:

1. A composite closure for a container, comprising:
   (a) a lower, inner ring section made of a resilient material, having inner and outer walls and upper and lower peripheral margins and a first integral annular flange projecting radially inwardly from the inner wall of said lower ring section;
   (b) an upper, outer ring section made of a resilient material, having inner and outer walls and upper and lower peripheral margins and adapted to releasably snap fit over said lower ring section, said upper ring section having a second integral annular flange projecting radially inwardly from the inner wall of said upper ring section in close parallel proximity to said first annular flange, wherein the inner wall of said upper ring section presents wall projections adapted to mate with detents in the outer wall of the lower ring section for a snap lock fit when the upper ring section is pressed onto the lower ring section, but which are readily disengaged from said detents by manually drawing the lower periphery of the upper ring section outwardly away from the outer wall of the lower ring section; and
   (c) a cover panel formed from generally flexible sheet material, peripherally held and compressed between said first and second annular flanges by means of the snap fitting of the upper ring section onto the lower ring section.

2. A composite closure according to claim 1, wherein:
   (a) a container has an opening with a peripheral lip formation;
   (b) the lower peripheral margin of said lower ring portion extends vertically below the lower peripheral margin of said upper ring portion;
   (c) said lower ring portion is circumscribed by a rupturable line of weakness vertically below the lower peripheral margin of said upper ring portion; and
   (d) a plurality of resiliently deformable teeth depends from the lower peripheral margin of said lower ring portion in an upward and inward direction, precluding removal of the closure from the container without a detectable breaking along at least part of said rupturable line of weakness.

* * * * *